United States Patent
Duong et al.

(10) Patent No.: US 7,711,157 B2
(45) Date of Patent: May 4, 2010

(54) ARTIFICIAL INTELLIGENCE SYSTEMS FOR IDENTIFYING OBJECTS

(75) Inventors: Tuan A. Duong, Glendora, CA (US); Vu A. Duong, Rosemead, CA (US); Allen R. Stubberud, Irvine, CA (US)

(73) Assignee: California Institute of Technology, Pasadena, CA (US)

( * ) Notice: Subject to any disclaimer, the term of this patent is extended or adjusted under 35 U.S.C. 154(b) by 939 days.

(21) Appl. No.: 11/498,531

(22) Filed: Aug. 1, 2006

(65) Prior Publication Data

US 2009/0116747 A1    May 7, 2009

(51) Int. Cl.
*G06K 9/00* (2006.01)
*G06K 9/46* (2006.01)

(52) U.S. Cl. .......................... 382/118; 382/165; 382/203

(58) Field of Classification Search .................. 382/203, 382/165, 118; 340/5.53, 5.83
See application file for complete search history.

(56) References Cited

U.S. PATENT DOCUMENTS

| | | | | |
|---|---|---|---|---|
| 6,111,517 | A * | 8/2000 | Atick et al. ................. | 340/5.83 |
| 6,882,756 | B1 | 4/2005 | Bober | |
| 2003/0099376 | A1 | 5/2003 | Kim et al. | |
| 2006/0110034 | A1 * | 5/2006 | Boncyk et al. ............... | 382/165 |

FOREIGN PATENT DOCUMENTS

WO        01/84499        11/2001

OTHER PUBLICATIONS

E. Oja and J. Karhunen, "On stochastic approximation of the eigenvectors and eigenvalues of the expectation of a random matrix." J Math. Anal. Appl., vol. 106, pp. 69-84, 1985.

T. A. Duong, "Real time on-chip sequential adaptive principal component analysis for data feature extraction and image compression." GOMAC Tech-03, vol. I, pp. 460-465, Tampa, Florida, Mar. 31-Apr. 3, 2003.

T. A. Duong, "Real time adaptive color segmentation for mars landing site identification." Journal of Advanced Computational Intelligence and Intelligent Informatics, pp. 289-293, vol. 7 No. 3, 2003.

(Continued)

*Primary Examiner*—Jon Chang
(74) *Attorney, Agent, or Firm*—Steinfl & Bruno (57) ABSTRACT

A process for object identification comprising extracting object shape features and object color features from digital images of an initial object and storing the extracted object shape features and object color features in a database where said extracted object shape features and object color features are associated with a unique identifier associated with said object and repeating the first step for a plurality of different objects. Then extracting object shape features and object color features from a digital image of an object whose identity is being sought and correlating the extracted object shape features and object color features of the object whose identity is being sought with the extracted object shape features and object color features previously stored in the database. If a first correlation of the extracted object shape features is better than a first threshold value for a given object associated with an identifier in the database and if a second correlation of the extracted object color features is better than a second threshold value for the given object, then making a determination that the object whose identity is being sought is said given object.

15 Claims, 8 Drawing Sheets

Figure 7a

OTHER PUBLICATIONS

T. A. Duong and Allen R. Stubberud, "Convergence analysis of cascade error projection: An efficient hardware learning algorithm." International Journal of Neural System, vol. 10, No. 3, pp. 199-210, Jun. 2000.

H. Ito et al., "Dynamically reconfigurable logic LSI-PCA-1." Digest of Technical Papers of 2001 Symposium on VLSI Circuits, pp. 103-106, 14-16, 2001.

Baldi, P., et al., "Learning in linear neural networks: A survey", *IEEE Tranactions on Neural Networks*, vol. 6, pp. 837-857 (1995).

Bannour, S., et al., "Principle Component Extraction Using Recursive Least Squares Learning", *IEEE Transactions on Neural Networks*, vol. 6, No. 2 (Mar. 1995).

Bell, A.J., et al., "An Information-Maximization Approach to Blind Separation and Blind Deconvolution", *Neural Computation*, 7:1129-1159 (1995).

Cardoso, J., "High Order Contrast for Independent Component Analysis", *Neural Computation*, (1998).

Chatterjee, C., et al., "Algorithms for accelerated convergence of adaptive PCA", *IEEE Transactions on Neural Networks*, vol. 11, No. 2, pp. 338-355 (Mar. 2000).

Chauvin, Y., "Principal component analysis by gradient descent on a constrained linear Hebbian cell", *Proceedings of Joint International Conference of Neural Networks*, vol. 1, pp. 373-380 (1989).

Cichocki, A., et al., "Robust Estimation of Principal Component in Real Time", *Electronics Letters*, vol. 29, No. 21, pp. 1869-1870 (1993).

Duong, T. A., Cascade Error Projection-An Efficient Learning Algorithm,UCI Ph. D Thesis (1995).

Duong, T.A., et al., "Learning in Neural networks: VLSI implementation strategies", *Fuzzy logic and Neural Network Handbook*, Ch. 27 (1996).

Friedman, J.H., "Exploratory Projection Pursuit", *Journal of American Statistical Association*, vol. 82, pp. 249-266 (1987).

Fu, Z., et al., "Conjugate gradient Eigenstructure tracking for adaptive spectral estimation", *IEEE Transactions on Signal Processing*, vol. 43, pp. 1151-1160 (1995).

Ito, H, et al., " Dynamically reconfigurable logic LSI-PCA-1" *Digest of Technical Papers of 2001 Symposium on VLSI Circuits*, pp. 103-106 (2001).

Jain, A.K., et al., "Statistical Pattern Recognition: a Review", *IEEE Transactions on Pattern Analysis and Machine Intelligence*, vol. 22, No. 1 (Jan. 2000).

Konishi, R., et al., "PCA-1: a fully asynchronous, self-reconfigurable LSI", *Seventh International Symposium on Asynchronous Circuits and Systems 2001*, pp. 54-61 (Mar. 11-14, 2001).

Miao, Y., "comments on Principal Component Extraction Using Recursive Least Squares Learning", *IEEE Transactions on Neural Networks*, vol. 7, No. 4, pp. 1052 (1996).

Oliveira, P.R., et al., "A comparison bewtween PCA neural networks and the JPEG standard for performing image compression", *Proceedings of Cybernetic Vision*, pp. 112-116 (Dec. 1996).

Sanger, T.D., "Optimal unsupervised learning in a single-layer linear feedforward neural network", *Neural Networks*, vol. 2, pp. 459-473 (1989).

Xu, L., "Least mean square error reconstruction principal for self-organizing neural-nets", Neural Networks, 6, pp. 627-648 (1993).

PCT International Search Report for PCT/US2007/015227 filed on Jun. 29, 2007 in the name of California Institute of Technology et al.

PCT Written Opinion for PCT/US2007/015227 filed on Jun. 29, 2007 in the name of California Institute of Technology et al.

\* cited by examiner prior art

ARTIFICIAL INTELLIGENCE SYSTEMS FOR IDENTIFYING OBJECTS

TECHNICAL FIELD

The disclosed technology relates to artificial intelligence and to security systems where it can be very advantageous to be able to identify a human subject, by examining an image of the subject's face. The present invention provides for human identification by comparing features extracted from an image against a database of extracted human face features and then making a computerized determination regarding whether the image of the human matches a human in the database. The extracted features relate to both shapes and color information.

BACKGROUND

In recent years, real time object recognition in a dynamic environment is a challenging and important task that has been approached by many researchers in an attempt to provide solutions for the practical real world applications, e.g., NASA precision landing of spacecraft and many identification applications for Home Land Security.

The term Artificial Intelligence is usually associated with expert systems, which use a set of logical rules to classify data. Unfortunately, such rule-based systems break down if two rules are contradictory or if a set of rules creates an infinite recursion that idles the system. To fix this problem, systems were developed that use soft rules by not only computing answers such as "one" for "yes" and "zero" for "no", but also numbers between one and zero for "perhaps." Popular soft classifiers are artificial neural networks, fuzzy systems, Bayesian networks, and support vector machines.

For problems with rich data sources such as image recognition, computer vision, and speech recognition, the dimension of the input vector is typically larger than the number of input samples, which leads to overfitting of the data if no care is taken to achieve useful generalization. Furthermore, the computing power becomes rapidly insufficient to process the data within reasonable time. To avoid these problems, the data is typically preprocessed to get rid of redundant information. Support vector machines [1], learning by hints [2], Principal Component Analysis (PCA) [3] or Cellular Neural Networks (CNN) [4] reduce the dimension of the input vector set. Such data extraction has also the advantage to eliminate some irrelevant data, such as small amplitude noise, and to speed up the classification step. In Section B.1, we will focus on the friendly hardware algorithm, which has been developed at JPL to compute PCA in real time by using specialized parallel distributed hardware.

PCA has proven its preprocessing capabilities in various successful applications such as data compression, feature extraction for recognition, face recognition, source separation etc.

Data extraction methods and classifiers do not address the problems that are typical for time series. Time series are particularly hard to analyze since events that are reflected in past data may cause effects in current data. Furthermore, an agent has to choose an action without having access to future data.

Principal Component Analysis (PCA)

Principal Component Analysis (PCA) is a second order statistical approach, which has been used to extract the features of a data set or to perform data compression. Specially, when data set is Gaussian, redundant and overwhelmingly large, PCA is a very effective preprocessing step to extract data features for classification and/or cluster data in the most compact energy vectors for data compression. Unfortunately, PCA requires that the basis vectors are orthogonal, which is typically an artificial assumption. To obtain the principal component vectors, traditionally the covariance or correlation matrix is calculated, then eigen values are obtained, and corresponding to each eigen value, a component (eigen) vector is found. This procedure is complicated and computationally intensive ($O(N^3)$ where N is dimension of the vector input), thus making it impracticable to use for rich data sources. Certain applications, such as classification, navigation, and tracking, only require a few principal component vectors, which is often a good compromise between computing speed, compact and/or low power device. In this case, the traditional technique for computing PCA becomes unnecessarily costly. Moreover, hardware implementations of the traditional PCA algorithm become even more challenging. To get over the hurdles from the traditional PCA technique, simple sequential PCA techniques have been introduced (see E. Oja and J. Karhunen, "On stochastic approximation of the eigenvectors and eigenvalues of the expectation of a random matrix." *J. Math. Anal. Appl.*, vol. 106, pp. 69-84, 1985). These techniques are based on a learning approach that sequentially obtains principal component vectors. Some works in PCA are reported using Hebbian or anti-Hebbian learning and gradient-based learning or even fancier technique of natural gradient descent. Most of the work on PCA is using software-based approaches wherein the computation power is mainly based on the microprocessor, DSP, or FPGA. These techniques are power hungry and hard-to-miniaturized the system in the chip level. For VLSI hardware implementation approach, there are some PCA works reported by R. Konishi et al. "PCA-1: a fully asynchronous, self-reconfigurable LSI," Seventh International Symposium on Asynchronous Circuits and Systems, 2001 (ASYNC 2001, pp. 54-61, 11-14 Mar. 2001 and H. Ito et al. "Dynamically reconfigurable logic LSI-PCA-1," Digest of Technical Papers of 2001 Symposium on VLSI Circuits, pp. 103-106, 14-16, 2001. For sequential PCA, the gradient descent (GED) technique is a more attractive approach for hardware implementation as a straight forward technique compared to others e.g. steepest decent, conjugate gradient, or Newton's second order method, but it exposes some difficulties in learning convergence when other principal component vectors are corresponding to smaller eigen values. In addition, this technique still requires some complicated hardware.

At Jet Propulsion Laboratories (JPL) in Pasadena, Calif., an optimal PCA learning technique has been developed by the present inventors which serves two purposes: 1) it simplified the required hardware implementation, specially in VLSI as System-On-A-Chip approach; 2) provided a fast and reliable convergence as compared with counterpart gradient descent (it is also a hardware-friendly approach). Furthermore, this new technique is theoretically proven to converge in the same attractor qualitatively as gradient-based technique, and it requires much less computation and optimized architecture to be more suitable for hardware implementation as a real time adaptive learning system.

We adapt the objective function below:

$$J(w) = \sum_{i=1}^{m} J_i(w_i) = \sum_{i=1}^{m} \sum_{t=1}^{k} |x_t - w_i w_i^T x_i|^2 \quad (1)$$

where m is the number of principal components and k is the number of measurement vectors. $t_x$ is a measured vector at time t and $w_i$ is the $i^{th}$ principal vector (or eigen vector).

With $$J_i(w_i) = \sum_{t=1}^{k} |y_i^t - w_i w_i^T y_i^t|^2 \text{ And } y_i^t = x_t - \sum_{j=1}^{i-1} w_j w_j^T x_t \quad (2)$$

a) PCA Learning Approach

From equation (2), the learning algorithm can be processed sequentially for each principal vector that is based on the gradient descent as follows:

$$\Delta w_{ij} = -\frac{\partial J_i}{\partial w_{ij}} = -\frac{\partial \left(|y_i^t - w_i w_i^T y_i^t|^2\right)}{\partial w_{ij}} \quad (3)$$

From equation (3), only the dominant element (see T. A. Duong, V. A. Duong, "A New Learning Technique of Sequential Adaptive Principal Component Analysis for Fast Convergence and Simplified Hardware Implementation" submitted to *IEEE. Trans. On. Neural Networks*, currently unpublished—a copy of same is enclosed as Appendix A) is used; the weight update can be obtained as follows:

$$w_{ij}^{new} = w_{ij}^{old} + \zeta \Delta w_{ij} = w_{ij}^{old} + \zeta \varepsilon_{ij}(w_i^T y_i^t + w_{ij} y_i^t) \quad (4)$$

$$\text{Where } \zeta = \frac{E_0}{E_{i-1}} \text{ and } \hat{y}_i^t = w_i w_i^T y_i^t$$

$E_0$ is the initial energy when the network starts learning and $E_{i-1}$ is the energy of the $(i-1)^{th}$ extracted principal.

b) Cell Learning Architecture

Figure 1:
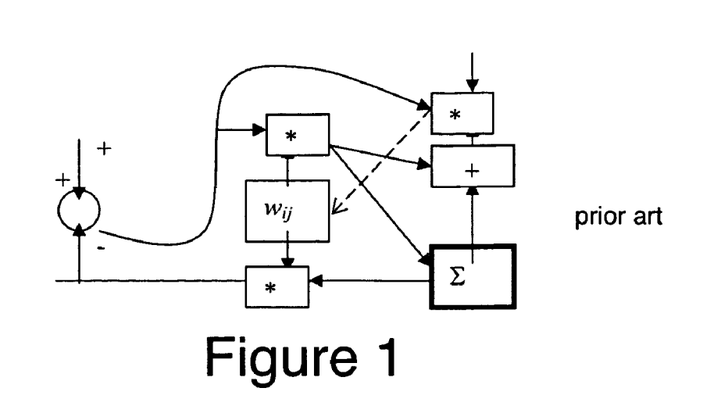
FIG. 1 is a schematic diagram of a PCA learning unit.

From equation (4), the learning architecture is realized as in FIG. 1. In FIG. 1, the input data $y_{ij}$ (i is the index of the component vector and j is the index of a value in the component vector i) is defined in the equation (2). The Σ box provides the inner product between vectors y and $w_i$. The result of the Σ box operation will, again, be summed with the previous multiplication of $y_{ij}^t$ and $w_{ij}$ and its output will be multiplied with the learning rate $\zeta$ before updating to $w_{ij}$ as described in equation (4). This single unit can be cascaded into n units to obtain a PCA learning vector and this learning vector can be cascaded to obtain many as parallel eigenvector extractors as needed for each application.

c) Applications

In a study at JPL (which is reported: T. A. Duong "Real Time On-Chip Sequential Adaptive Principal Component Analysis for Data Feature Extraction and Image Compression", *GOMAC Tech-03, Vol. I*, pp. 460-464, Tampa, Fla., 31 Mar.-3 Apr., 2003 (hereinafter "GOMAC"—and which is hereby incorporated herein by reference), we used two gray scale images: a woman and a tank as shown in FIGS. 3a and 4a of the aforementioned GOMAC publication. The purpose of this study was to evaluate how well our technique can extract the features of these images via principal components as opposed to the MATLAB technique and from the extracted features we can process for image compression. The woman image of FIG. 3a of the GOMAC publication consists of 256×256 gray pixel and each pixel has 8-bit quantization. FIG. 4a, from GOMAC, is 512×512 pixel image of a tank with 8-bit gray scale/pixel.

We used input vector as row data with 64 pixel/vector to construct the training vector set. When the training vector set is available, the algorithm as shown in equation (4) is applied to extract the principal vector. Our study has shown that the maximum number of iterations required is 150 of learning repetitions and the first 20 component vectors are extracted.

Feature Extraction

Figure 2A:
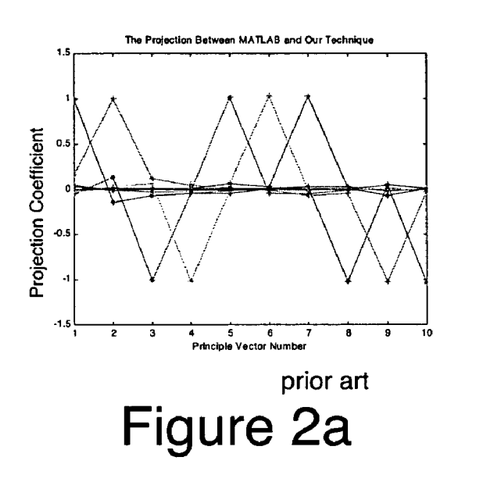
FIG. 2a is the projection (inner product) result of 10-component vector extracted from FIG. 2 using the explained technique on a 10-component vector from MATLAB.

Feature extraction using PCA is a well known approach and is based on the most expressive features (eigen vectors with the largest eigenvalues). The first 10-component vector extracted from Elaine image using our technique is projected onto the first 10-component vector from MATLAB (inner product) and its results are shown in FIG. 2a.

As orthogonal characteristics between principal vectors, if the learning component vector and the component vector from MATLAB are the same sequential order and identical (or close to identical), the expected inner product should be close to +/−1; otherwise, it should be close to zero.

Figure 2B:
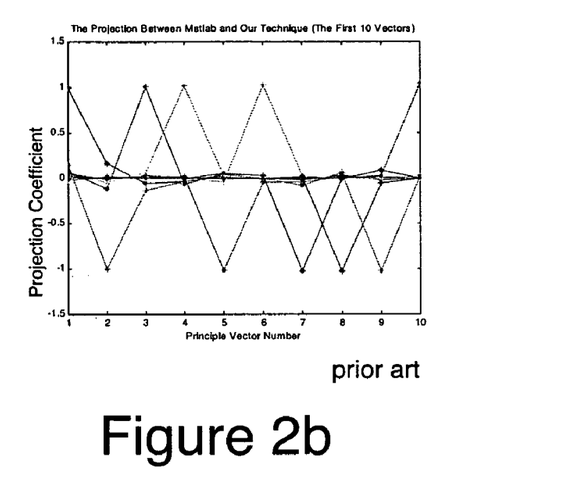
FIG. 2b is the projection (inner product) result of 10-component vector extracted from FIG. 3 using the explained technique on a 10-component vector from MATLAB.

The first 10-component vector extracted from tank image using MATLAB and our approach and the projection between principal vectors are shown in FIG. 2b. As shown in FIGS. 2a and 2b, there are ten unit values (+/−1) and the rest of the values are close to zero from which our technique can extract the feature vector as identical as that with the MATLAB technique.

Compression

In the study, we extracted the first 20-component vector from full set of 64 component vectors. Since the full image is constructed from the first 20 component principal vectors extracted using technique in MATLAB shown in FIGS. 3b and 4b (these two figures are from the GOMAC publication) and we use the same components in our technique for FIGS. 3c and 4c (again these figures are from the GOMAC publication).

d) Discussion

The advantages of this approach are: less computation, fast convergence, and simplified hardware architecture as compared against other sequential PCA approaches and our approach may be the most suitable for hardware implementation. The orthogonal constraint in PCA may have the advantages for reconstruction for data compression; however, it may not be an optimal technique for feature data extraction or mixing source data. Perhaps, ICA may be more suitable for such applications.

Neural Networks

PCA and is considered as unsupervised learning technique, which extracts the transformation based on its data structure. For example, the principal vector is obtained based on its own data set, regardless of any influence by users or operator. In contrast with the unsupervised learning, the supervised learning technique requires the desired output as user or operator's desire to enforce the parameterized weight space as transformation based on the input data set. When done, the estimated output data by the input data set via the parameterized transformation will theoretically be in the neighborhood of the desired output.

Most supervised learning neural networks focus on a software-based approach, in which the learning trajectory with respect to the weight space is often smooth when the bit quantization of the weight components and update weights are 32 bit or 64 bit floating point numbers. When the weight component and the weight update are of 8-bit value (which is typically based upon hardware implementation constraints), learning convergence is difficult. In real time applications, algorithms with fast learning and adaptive capabilities are needed. In a published previous report by inventor Duong (T. A. Duong and Allen R. Stubberud, "Convergence Analysis Of Cascade Error Projection—An Efficient Learning Algorithm For Hardware Implementation", *International Journal of Neural System*, Vol. 10, No. 3, pp. 199-210, June 2000, the disclosure of which is hereby incorporated hereby by reference) it was shown that the Cascade Error Projection (CEP) algorithm provides an excellent tool for hardware implementation. CEP is an improved learning algorithm for artificial neural networks that is reliable and well suited for implementation in VLSI circuitry. In comparison with other neural-network-learning algorithms, CEP involves a self-evolving structure, requires fewer iterations to converge, and is more tolerant to low resolution in the quantization of synaptic weights; thus, CEP learns relatively quickly and the circuitry needed to implement it is relatively simple, as taught by the aforementioned paper by inventor Duong.

CEP Algorithm Approach

Figure 3:
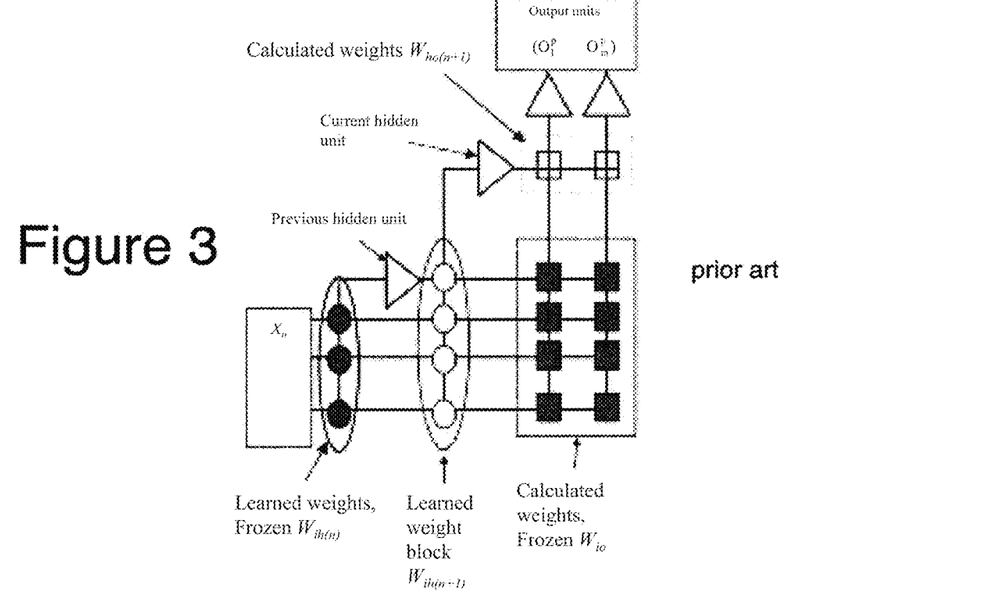
FIG. 3 depicts the architecture of CEP which includes inputs, hidden units, and output units. The shaded circles or squares indicate the learned or calculated weight set that is computed and frozen. A circle indicates that perception learning is applied to obtain the weight set, and a square indicates that the weight set is deterministically calculated.

The CEP neural network architecture is illustrated in FIG. 3. Shaded squares and circles indicate frozen weights; a square indicates calculated weights, and a circle indicates learned weights.

Mathematical Approach:

The energy function is defined as:

$$E(n+1) = \sum_{p=1}^{P} \left\{ f_h^p(n+1) - \frac{1}{m}\sum_{o=1}^{m}(t_o^p - o_o^p) \right\}^2$$

The weight update between the inputs (including previously added hidden units) and the newly added hidden unit is calculated as follows:

$$\Delta w_{ih}^p(n+1) = -\eta \frac{\partial E(n+1)}{\partial w_{ih}^p(n+1)}$$

and the weight update between hidden unit n+1 and the output unit o is $$w_{ho}(n+1) = \frac{\sum_{p=1}^{P} \varepsilon_o^p f_o'^p f_h^p(n+1)}{\sum_{p=1}^{P} [f_o'^p f_h^p(n+1)]^2} \text{ with } f(x) = \frac{1-e^{-x}}{1+e^{-x}} \quad (8)$$

The notations used are defined as follows:

m is the number of outputs, P is the number of training patterns.

Error $\varepsilon_o^P = t_o^P - o_o^P(n)$; where $o_o^P(n)$ is the output element o of the actual output o(n) for training pattern p, and top is the target element o for training pattern p. n indicates the number of previously added hidden units.

$f'_o{}^P(n) = f'_o{}^P$ denotes the output transfer function derivative with respect to its input.

$f_h^P(n+1)$ denotes the transfer function of hidden unit n+1.

The CEP algorithm is processed in two steps:

(i) Single Perception learning which is governed by equation (7) to update the weight vector $W_{ih}(n+1)$ (ii) When the single Perception learning is completed, the weight set $W_{ho}(n+1)$ can be obtained by the calculation governed by equation (8).

Details of the CEP algorithm and convergence analysis can be found in the aforementioned paper by inventor Duong.

Applications

For NASA applications, precision and safe landing is the primary goal in any spacecraft landing mission. To-date, however, the landing of spacecraft has been accomplished "blind" through the pre-selection of a landing site, with no in-situ corrections to the landing sequence to account for possible changes in the terrain, or for previously unrecognized fine granularity of the topography. This lack of intelligent autonomy in the landing sequence means that a landing site must be chosen a priori based on the statistical probability of not encountering dangerous terrain elements anywhere within a many square-kilometer ballistic footprint. Current Entry Decent Landing (EDL) software methods are only near real time in that they are incapable of identifying the topographical granularity of the pre-selected landing site at a rate required for safe landing. This near real time approach excludes many scientifically interesting landing sites. It is therefore obvious that some form of real time color segmentation is required to adaptively correct the spacecraft descent. For this, knowledge of terrain color and color segmentation is first incorporated through learning from pictures obtained by the orbiter imaging system. During the descent stage, the knowledge of color segmentation will be updated adaptively in real time to capture the contrast, light intensity, and changes in resolution that occur. This allows for the determination of a safe and productive landing site, and guidance of the spacecraft to this site through appropriate corrective navigational feedback control.

This shortcoming points to the need for adaptation as a primary requirement for real time dynamic landing site determination. In this section, we discuss a real time adaptive color segmentation approach using hardware-friendly neural network named CEP as an enabling technology developed at JPL.

Adaptive Architecture Approach

The most challenging aspect in color segmentation is when the light intensity and resolution are dynamically changing. It is easily recognized that the initial knowledge used to train the network will have very little effect at a new location and therefore will need to be updated through learning of newly extracted data.

Briefly, the adaptation process that can aid in spacecraft guidance may be described as follows: When the network that has acquired current knowledge at time to is used to test the subsequent image at time $t_o + \Delta t$, segmentation results from the image at $t_o + \Delta t$ will be used to extract the training set to update the previous knowledge of the network at time $t_o$. This process of repeatedly segmenting and updating is performed until the Lander reaches its destination.

While the process of segmenting and updating are desired characteristics of an adaptive processor, the issue that needs addressing is how often such updates are necessary. The frequency of updates has a direct impact on power consumption. More power is consumed if updates are performed between each sequential image. The problem with infrequent updates, however, is that the network may not interpolate easily based upon new images from which the newly segmented data may be insufficient for training. To find the optimal sampling rate, we realize $\Delta t$ must be "sufficiently small" and will depend upon the landing velocity and other environmental changes. This issue will become significant in the actual design and development of a spacecraft landing system.

Training Data

To classify each pixel, we used a pixel to be classified and its immediate neighbors to form a 3×3 sub-window as the input training pattern (thus each input pattern has 27 elements from 3×3 of a RGB pixel). Based on a previous study, the 3×3 RGB input pattern was found to be the optimal size in comparison to using a single RGB input, a 5×5 RGB sub-window, or a 7×7 RGB sub-window. In this study, our objective was to segment the image into three groups: "Rock1", "Rock2", and "Sand". The topology of our network is a 27×5×3 cascading architecture neural network, having 27 inputs, 5 cascaded hidden units, and 3 output units.

Figure 4A:
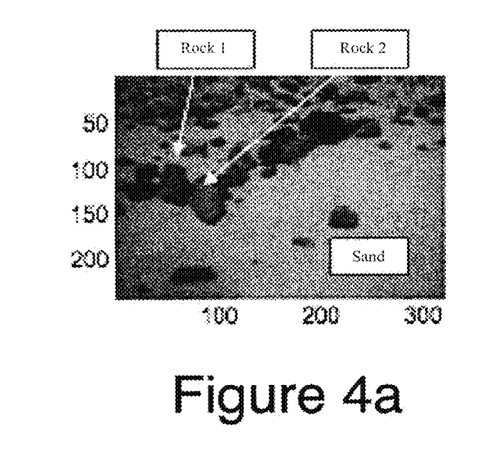
FIG. 4a depicts an original image collected at 3 p.m.

In FIG. 4a herein, which depicts a 3:00 PM image, we sampled and collected 408 patterns for training data, 588 patterns for cross validation, and 1200 patterns for testing. With these sample sets, the learning is completed with 91% correct in training, 90% correct in validation, and 91% correct in testing.

Figure 4B:
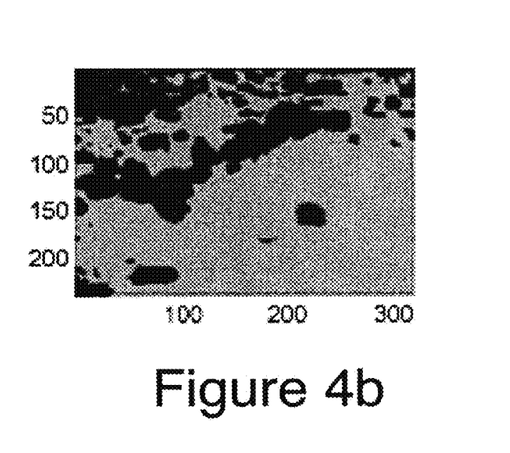
FIG. 4b shows the subject matter of FIG. 4a after image training.

After training was performed, the segmented output of the original image in FIG. 4a is shown in FIG. 4b herein.

Figure 5A:
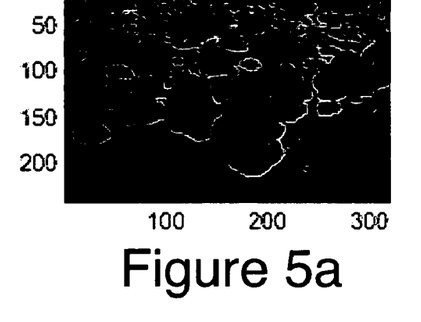
FIG. 5a depicts an original image collected at 4 p.m.
Figure 5B:
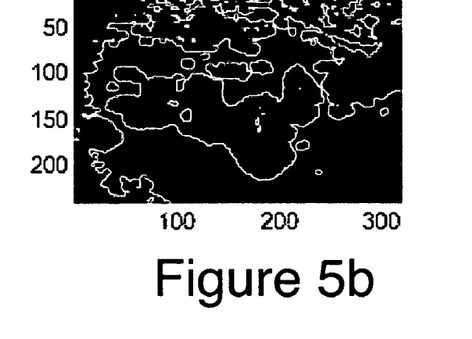
FIG. 5b shows the subject matter of FIG. 5a as a segmented image based on the previous training data collected at 3 p.m. (with no intermediate adaptive processing).
Figure 5C:
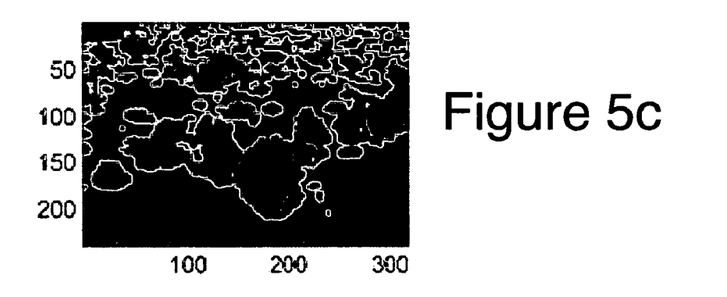
FIG. 5c shows the subject matter of FIG. 5a as a segmented image based on the previous training data collected at 3 p.m. (with intermediate adaptive processing).

With the knowledge acquired from the image of FIG. 4a herein, the network is tested with the image input shown in FIG. 5a, collected at 4:00 PM. The output result is shown in FIG. 5b (no intermediate adaptation step was performed). FIG. 5c is output result with the network acquired from the intermediate knowledge through adaptive learning.

Figure 6A:
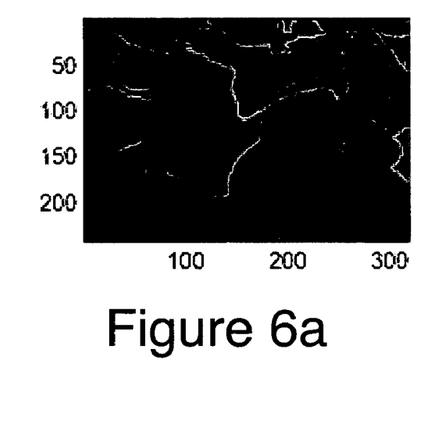
FIG. 6a depicts an original image collected at 5 p.m.
Figure 6B:
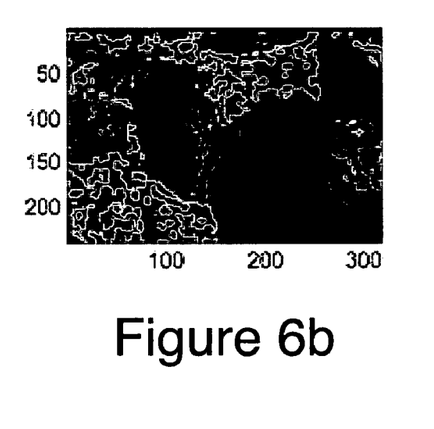
FIG. 6b shows the subject matter of FIG. 6a as a segmented image based on the previous training data collected at 4 p.m. (with no intermediate adaptive processing).
Figure 6C:
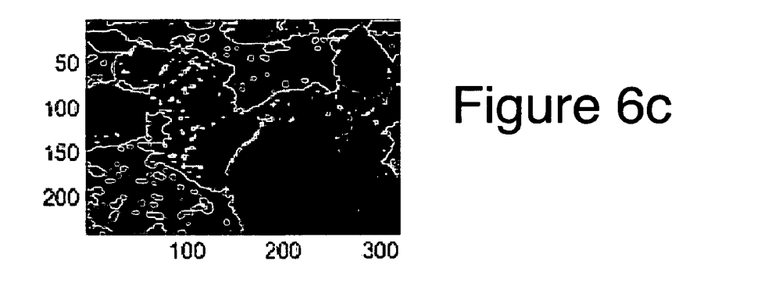
FIG. 6c shows the subject matter of FIG. 6a as a segmented image based on the previous training data collected at 4 p.m. (with intermediate adaptive processing).

In a similar manner, the original image shown in FIG. 6a was collected at 5 PM. FIG. 6b is the segmented image with the previous training set at 4 PM and FIG. 6c is the segmented image with intermediate adaptive step.

Based on the aforementioned results, we might conclude that the adaptive technique is needed to obtain better segmentation when the environment is changing rapidly.

CONCLUSIONS BASED ON THE PRIOR ART AND BRIEF SUMMARY OF THE PRESENT INVENTION

As indicated above, real time object recognition in a dynamic environment is a challenging and important task that has been approached by many researchers in an attempt to provide solutions for the practical real world applications, e.g., NASA precision landing of spacecraft and many identification applications for Home Land security. When an object to be identified moves, the light intensity of the image scene smoothly changes and adaptive color segmentation methods can be used. See T. A. Duong, "Real Time Adaptive Color Segmentation for Mars Landing Site Identification," *Journal of Advanced Computational Intelligence and Intelligent Informatics*, pp. 289-293, Vol. 7 No. 3, 2003, the disclosure of which is hereby incorporated herein by reference Another common problem that can occur is that the image of the shape of an object may also change predictably and an adaptive feature-based recognition method can be used. See A. K. Jain, R. P. W. Duin, and J. Mao "Statistical Pattern Recognition: A Review", *IEEE Transactions on Pattern Analysis and Machine Intelligence*, Vol. 22, No. 1, January 2000.

However, the prior art does not teach and the present application is directed to an innovative closed-loop technique, in which an adaptive feature-based method and an adaptive color-based method interact to solve the object recognition problem in a dynamic environment, in particular, when random changes take place. In such an environment, a single technique, e.g., a feature-based approach or a color-segmentation approach may be inadequate.

The present invention provides a process for object identification comprising:

(a) extracting object shape features and object color features from digital images of an initial object and storing the extracted object shape features and object color features in a database where said extracted object shape features and object color features are associated with a unique identifier associated with said object;

(b) repeating the first step for a plurality of different objects;

(c) extracting object shape features and object color features from a digital image of an object whose identity is being sought;

(d) correlating the extracted object shape features and object color features of the object whose identity is being sought with the extracted object shape features and object color features previously stored in said database and    (i) if a first correlation of the extracted object shape features is better than a first threshold value for a given object associated with an identifier in said database and    (ii) if a second correlation of the extracted object color features is better than a second threshold value for said given object;

(e) then making a determination that the object whose identity is being sought is said given object.

The foregoing summary is not intended to be inclusive of all aspects, objects, advantages and features of the present invention nor should any limitation on the scope of the invention be implied therefrom. This Brief Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

BRIEF DESCRIPTION OF THE FIGURES

FIG. 10a is an image of yet another position of the object shown in FIGS. 8a, 8b and 9a.

DETAILED DESCRIPTION

This technology has wide application in security systems where it can be very advantageous to be able to identify a human subject, by examining an image of the subject's face, comparing its extracted features against a database of extracted human face features and then making a computerized determination regarding whether the image of a human matches a human in the database.

As indicated above, the present disclosure relates to an adaptive feature-based method and an adaptive color-based method interact to solve the object recognition problem in a dynamic environment, in particular, when random changes take place. During testing done at JPL it was determined by on simulation of the architecture proposed herein that the combined detection using a shape feature based technique and a color based technique gives optimal detection of a region of interest and a minimized adaptive step can be used to update the methods when changes of shape and color occur. A preferred embodiment of the procedure, which is described below in detail with reference to FIGS. 7a and 7b, can be better understood when the reader understands that it is based upon:

(1) Two algorithms developed at JPL, Cascade Error Projection for adaptive color segmentation (see T. A. Duong, V. A. Duong, "A New Learning Technique of Sequential Adaptive Principal Component Analysis for Fast Convergence and Simplified Hardware Implementation." Submitted to *IEEE. Trans. On. Neural Networks*) and the Optimal Friendly Hardware Principal Component Analysis for shape feature extraction (see T. A. Duong "Real Time On-Chip Sequential Adaptive Principal Component Analysis for Data Feature Extraction and Image Compression", *GOMAC Tech-03, Vol. I*, pp. 460-464, Tampa, Fla., 31 Mar.-3 Apr., 2003 and T. A. Duong and Allen R. Stubberud, "Convergence Analysis of Cascade Error Projection: An Efficient hardware learning algorithm", *International Journal of Neural System, Vol.* 10, *No.* 3, *pp.* 199-210, *June* 2000, the disclosures of which are hereby incorporated herein by reference), were employed. The closed loop interaction between these methods allow obtaining the optimal and accurate region of interest for 3-D object detection in a changing environment.

(2) Using a combination of the previously developed color and shape feature extraction methods, the region of interest (containing the object to be examined) of the current image is more accurately detected and thus allows the acquisition of knowledge about the changes of the moving object. The feedback interaction architecture enables real time adaptation (See Appendix B).

Due to the optimal architecture and simplicity of the learning technique, the color visual sensor (e.g., color Active Pixel Sensor), the shape and color feature extractors, and the neural network processor can be implemented by a system-on-a-chip approach, based on the present technical disclosure, to generate a real time, low power, and compact system to solve the dynamic object recognition and tracking problem in real time.

Figure 7A:
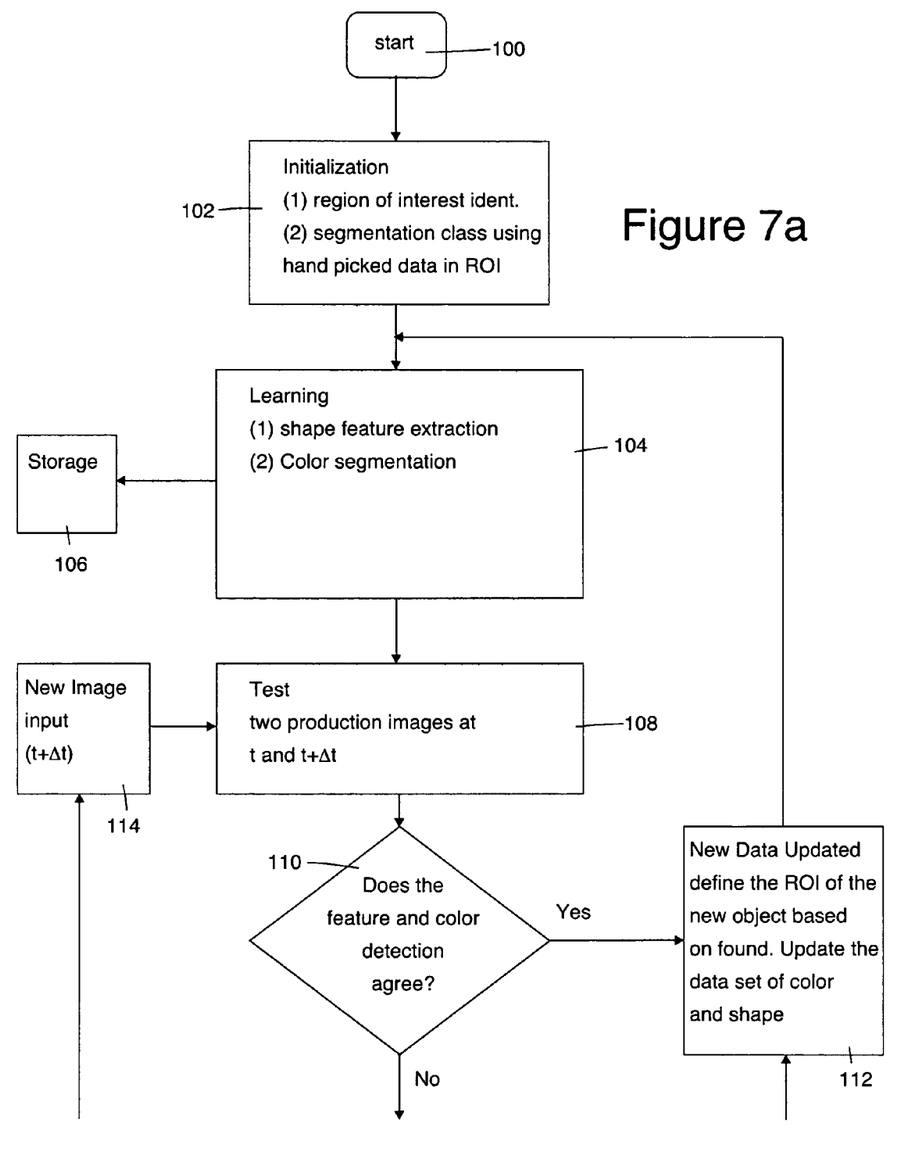
FIGS. 7a and 7b are the upper and lower portions, respectively, of a flow diagram showing one technique for providing an intelligent system for feature identification using both an unsupervised learning technique (PCA) and a supervised learning neural network which can be used to identify the features of human beings and most particularly the faces of human beings.
Figure 7B:
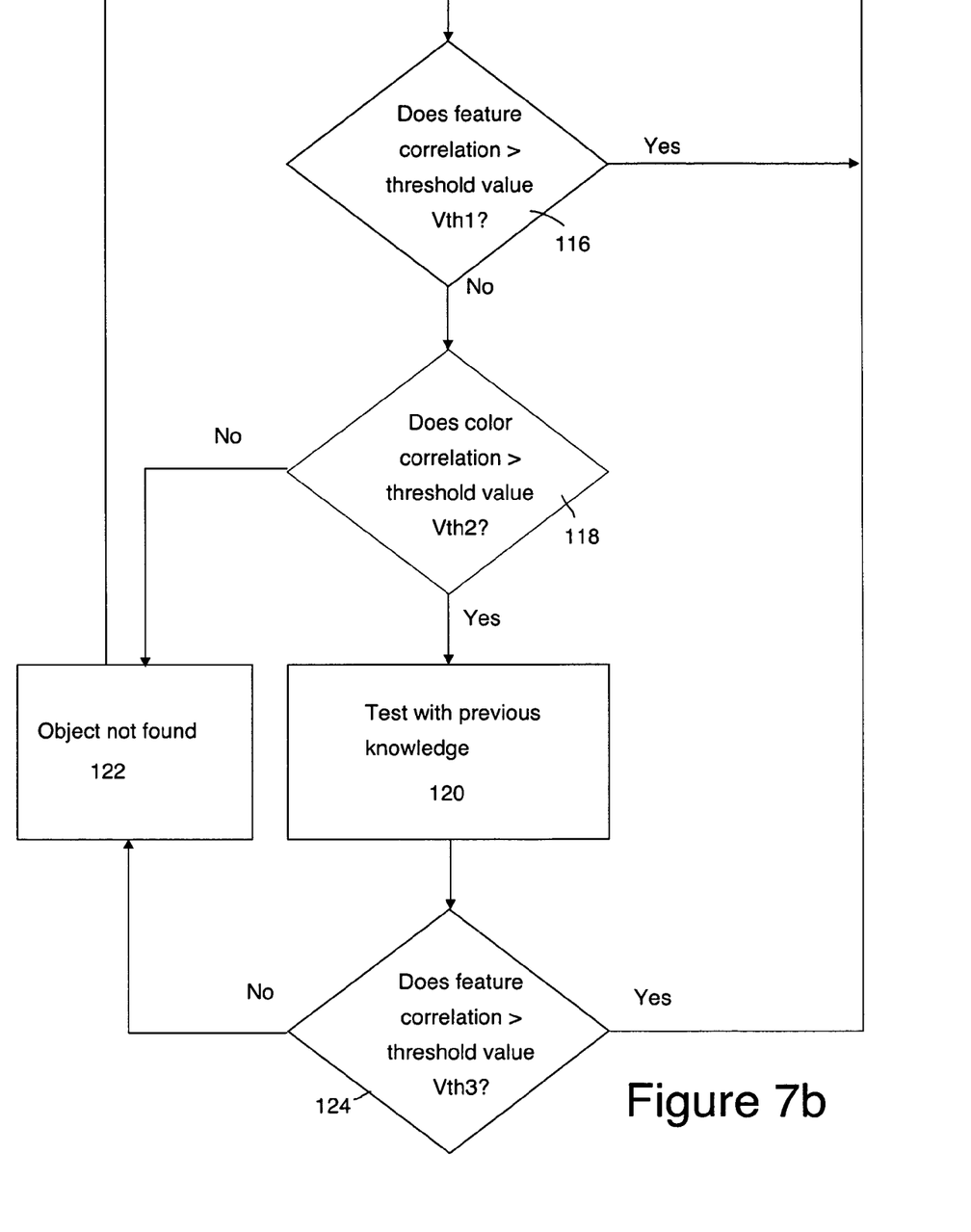
Figure 8A:
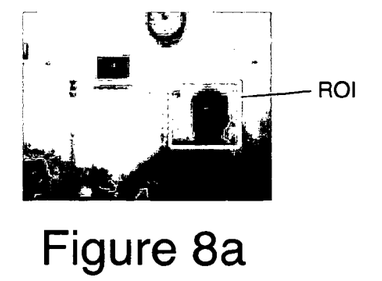
FIGS. 8a and 8b show digital images of an object (a human being and more particularly the human being's face) which were processed for shape and color feature extraction using the techniques described herein.

FIGS. 7a and 7b fit together to form a flow chart showing a preferred embodiment of our proposed technique for object recognition and particularly for human feature or face recognition. Turning to the flow diagram, the procedure starts at a block labeled 100, where a picture of a human may be taken. FIG. 8a depicts a image of what such a picture might well look like as the picture includes a lot of extraneous information in terms of background and environmental objects or just plain clutter. Of course, it might be easier if the picture were posed, much like a passport photograph, but the techniques of the present disclosure can be applied to nice clean images, such as those used for typical passport photographs, or the images can be more "messy" such as the image exemplified by FIG. 8a. A subregion or sub-window region of interest (ROI) consisting of the initial object to be detected is identified. At present, the initial finding of the ROI for the initial image of an object (a person in the specific example provided) is done manually by using a computer mouse, for example, to identify the ROI by identifying a rectangular (for example) shape on the image.

At block 102 we perform statistically feature extraction of the object in its initial position using the feature extraction technology discussed above. Additionally, color segmentation class is performed using a manually picked data set in sub ROIs to identify, for example, the major background color surrounding the face of the person, the person's hair color and the persons skin color, or, in a more general sense, the object's color. This can be done using again a mouse to identify the sub ROIs of interest. For reasons which should be self-evident, the sub ROIs should normally be located within the boundary of the ROI. When the processing on the data in the ROI and sub ROIs is done, we obtain extracted shape features of the object (based on the ROI) and color transform for color segmentation (based on the sub ROIs). These are "digital knowledge" of the object as reflected by its shape feature(s) and color feature(s). This "digital knowledge" is stored in a database 106.

Figure 8B:
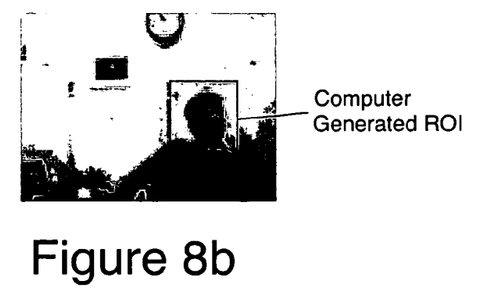

In order to have a reasonable starting point for "digital knowledge" about an object (and preferably a person's face), a first or initial image (see FIG. 8a, for example) is taken at a time t and preferably a second image is taken at a time t+$\Delta$t. An exemplary t+$\Delta$t image is shown by FIG. 8b. Note how the subject's head has changed position in the $\Delta$t time interval. The new image is taken at block 114. The t+$\Delta$t image is similarly processed to extract its "digital knowledge", that is its shape feature(s) and color feature(s). The two images, or more properly, their "digital knowledge" for t and the t+$\Delta$t images are then loaded at block 108 and compared at block 110. If the color and shape features agree, then the additional "digital knowledge" about the object (the subject's face in this embodiment) is then stored in database 106 and associated with the particular object (person) in question. So the number of features and the color space associated with the person (object) in the t+$\Delta$t image has expanded and the system has "learned" information regarding the person or object. The "digital knowledge" features are thus stored in database

106 for future comparisons when a new image of an object, less correlated with its previous position(s), is input into the system. Of course, the system is "trained" or "taught" about a number of objects (different faces of different human beings, as in this example) in this manner and the database is loaded with "digital knowledge" about that number of objects (individuals, as in this example). The system is then ready to start identifying individual by the faces (or, more generically, identifying objects by their shapes and colors) and the processing for such identification begins by capturing an image and extracting its "digital knowledge" that is its shape and color features at blocks 114 and 108 and then doing at least one comparison with previously (and preferably, most recently) stored (in database 106) shape and color features of objects. The at least one comparison is made at block 110 and preferably additional comparisons are made to help account for the fact that the object (a person's head in this preferred embodiment) may change position (so the feature extraction comparison test is not as close as one might like) or the lighting conditions may be different (so the color extraction comparison test is not as close as one might like).

There is no need to identify the ROI manually for a second (or subsequent) images of a particular object (individual in the preferred embodiment). Rather, the ROI in the case of FIG. 8*b* can be identified by finding in the image where a higher density of good correlations (shape and color) occur. A region is defined around the concentration of good shape and color correlations. This region (called "computer generated ROI on FIG. 8*b*) may have the same shape and size as the ROI which was manually defined for the very first image of a particular object, or the size (and possibly also the shape) of the computer generated ROI may be dynamically determined using known edge finding techniques (to find the edges of the object or face) and then spacing the limits of the computer generated ROI some predetermined distance for the detected edges. Having said this, if desired, the computer generated ROI shown in the second image (FIG. 8*b*) or in any subsequent image of the same object may be manually determined as opposed to computer generated to reduce the processing needed to determine where the ROI should be located within the captured image.

Before discussing the flow chart of FIGS. 7*a* and 7*b* in greater detail, one point needs to be made. This system is intended to obtain more and more digital knowledge about a set of objects (a number of persons' faces in the preferred embodiment) over time. Consider FIG. 9. FIG. 9 shows a sequence of images of a particular object (of a particular individual's face in the preferred embodiment) over time. The first two block might correspond (or be similar to) FIGS. 8*a* and 8*b*, and thus correspond to the first two images collected of a particular object. However, it is envisioned that over time more and more images of a particular object (person) will be collected over time. The testing done at block 110 is may be done by comparing the extracted shape and color information associated with an image of an unidentified object with the shape and color information stored in database 106. In order to simplify the initial processing, the testing at block 110 is only done with respect to the stored shape and color information of a most recently obtained (and stored, see below) image of an object. There could be thousands of different objects stored (in terms of their shape and color features) in the database and thus it is a bit of a judgment call as to how much processing of data should be done at this stage. Of course, if the processor used has a lot of processing power, then the shape feature and/or color features comparisons can involve larger data sets by including nor only the most recently stored information but also older information as well. Anyway, in FIG. 9 the most recently obtained and stored information corresponds to a recent image of an object (person), which is identified there by a dashed line about the right hand most image. Of course, the database in addition to storing the extracted shape and color information also preferably stores the images themselves and identifying information about the object (person), such as the object's name, an identification number, address, nationality, etc. some of this information is hopefully unique to the object (person). At the very least a database key would be uniquely associated with each separate object whose shape and color features are stored in the database.

The test at block 110 is typically not an identically-based test. Rather the feature correlation and color comparison tests preferably do not need to match exactly. Otherwise a change in object position or object lighting could produce a false negative). So a threshold $Vth1$ is preferably associated with an acceptable feature correlation comparison and another threshold $Vth2$ is preferably associated with an acceptable color correlation comparison. The smaller the thresholds, the tighter the testing and also the more likely that an object (face) will not be correctly associated with a object (face) already known based on the "digital knowledge" in database 106 (that is, false negatives will occur). The "yes" branch of block 110 means that the second (or later) image was found to fall within both thresholds, namely, $Vth1$ associated with the acceptable feature correlation comparison and $Vth2$ associated with the acceptable color correlation comparison. Also, if more than one object stored in the database 106 fall within the aforementioned thresholds, that is, the image collected at block 114 can be associated with multiple objects in the database (since they all fall with in the desired thresholds), then the system can either be arranged to identify the collected image a stored object having the best correlation based on the most recently stored shape and color features, or as will be described below, additional testing may be done using any historical shape (and possibly color) information in the data base 106 to better identify the identity of the collect image.

If the correlations for feature and color match do not both fall within these thresholds in block 110, then the "no" branch is taken from block 110 and preferably a test is made at block 116 to determine if the $Vth1$ feature correlation threshold was met alone. If so, the "yes" branch is taken from block 116 and an acceptable match is deemed to have occurred in this embodiment and processing continues at block 112 were the ROI is determined. Color and shape information may be added into the database 106 in a preferred manner which will be described in greater detail subsequently.

Of course, the $Vth1$ threshold at block 116 does not necessarily be the same value as the $Vth1$ threshold at block 110, although they are assumed to be the same in this embodiment. However, it could be that if a later-taken image does not produce properly correlated "digital knowledge" for both shape and color at block 110, then the testing at block 116 for shape correlation alone may be a more restrictive test, if desired.

If the object fails the test at block 116, then the "no" branch is taken preferably to a block 118 where the color correlation alone is tested against threshold $Vth2$ (again this can be the same threshold $Vth2$ mentioned above or it could be a different threshold value). If the color and shape correlations test both fail, then the "no" branch is taken to block 122. If the system is used in a security system setting, then sirens or alarms might well trigger at this stage (at block 122) since the system is reporting that the object under examination (a face, for example) does not have shape and color features which correlate within acceptable margins to data already in database 106.

In the comparison testing at block 110, if the pixel detection based on the maximum shape correlation which can be detected in a group of pixels (not a single pixel) due to the statistical feature technique overlaps with the color feature segmentation, then the object is deemed to have been properly detected and the "yes" branch is taken at block 110, and the database 106 may be updated to include the additional shapes and/or color information determined for the object under examination during the testing.

In block 118, if the color correlation does fall within the threshold value Vth2, then the "yes" branch is preferably taken to block 120 where the correlation testing is based not only on the most recently obtained shape information for each object in the database 106, but is also based on the historical shape information stored therein. Of course, this requires more data processing to do correlation resting not only with the most recently updated information, but for all information in the database 106. Whether the correlation testing is based on all shape feature data or some subset of the data in database 106 is a matter of choice. Preferably, when the correlation testing is done at block 118, a subset of objects are found as falling within the Vth2 threshold for color alone. In the context of our preferred embodiment wherein people's faces are analyzed, this subset might contain only three persons out of a thousand in the database whose skin color is sufficiently close to the facial colors in the image collected at block 114 to warrant further analysis. So instead of running the shape feature correlation testing against all objects in the database 106, it is instead run only against the historical shape feature information associated with the three objects (in this example) which met the threshold at block 118.

After testing the shape feature correlations against the historical data in block 120, a test is made to see if the best shape feature correlation found is better than a threshold Vth3, which is tested at block 124. If the threshold value of shape correlation detection is greater than Vt3, then the object to deemed to be found and the processing passes to block 112 where a new ROI is found. The new shape data may be added to the database 106 at block 104. On the other hand, if the threshold value of shape correlation detection is less than Vt3, the object is deemed to be not found and processing then passes to block 122.

Figure 8C:
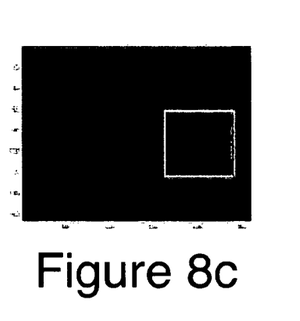
FIGS. 8c-8f show the projection image of the second, third, fourth and fifth PCA vectors, respectively.
Figure 8D:
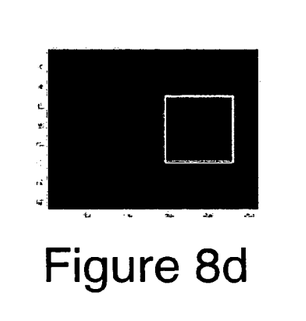
Figure 8E:
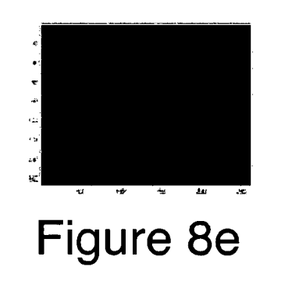
Figure 8F:
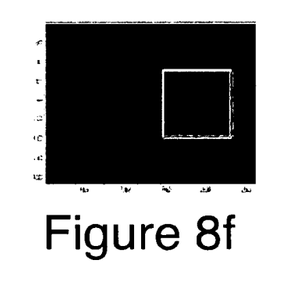

FIG. 8*a* shows the image of a possible initial image collected for processing according to the flow chart of FIGS. 7*a* and 7*b*, In FIG. 8*a* a region Of Interest (ROI) is identified. In accordance with the simulation testing which was done based on the flow chart, a sampling sub-image (75×60 pixels) was manually identified—see the white rectangle in FIG. 8*a*, and the data within that rectangle was processed for feature extraction as previously described. The first five principal vectors of feature extraction were acquired in this simulation. These principal vectors were used to project the raw image shown in FIG. 8*b* to obtain FIGS. 8*c*, 8*d*, 8*e* and 8*f* for the second, third, forth, and fifth principal vectors, respectively (the first principal image projection did not shown any productive information since it is more than likely offset data). It appeared that the second principal vector (FIG. 8*c*), the third (FIG. 8*d*), and the fifth (FIG. 8*f*) principal projection image provided the correct object in the dark box as shown in FIG. 8*b*, when combined.

When the ROI is located in FIG. 8*b* (or in any image collected thereafter of the objet), the data is sampled for updating new features at block 112. In block 112 the computer generated ROI is preferably identified as discussed above. Sub ROIs for the face and hair color (or other distinguishing colors) is also detected. This is preferably done by assuming that the sub RIOs will be in the same relative positions as in the image associated with the most recently store data and then colors are tested at that place to see if they agree within certain narrow thresholds to the previously stored data. If not, the image may be scanned to try to locate suitable sub ROIs.

If the color and shape information correlates very well with the most recently stored information for a particular individual, then a decision may be made at block 104 not to update the database with what is essentially repetitive shape and/or color information. Hence the newly collected shape and feature information may be discarded, if desired (although it may well be kept for other reasons). On the other hand, the additional extracted shape and color features for the identified object are preferably added to the database 106 if they fall within the relevant thresholds for the testing done at block 110 (for example), but are sufficiently different that the newly collected information is not really repetitive of the information already in the database 106. This additional information will then become the most recently stored information against which correlation testing will be done in block 108 for new images. So shape feature data is updated into the database 106 if the shape feature correlation is better than Vth1 but worst another threshold that is used to determine whether the shape feature data would otherwise be deemed to be too repetitive of the existing shape feature data.

Figure 9A:
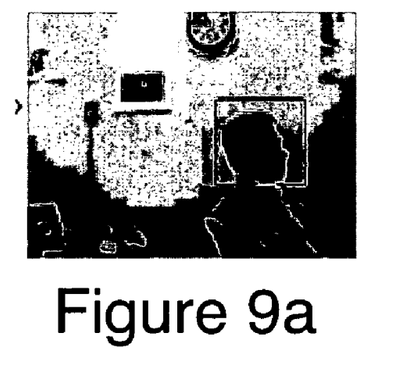
FIG. 9a is an image of another position of the object shown in FIGS. 8a and 8b.
Figure 9B:
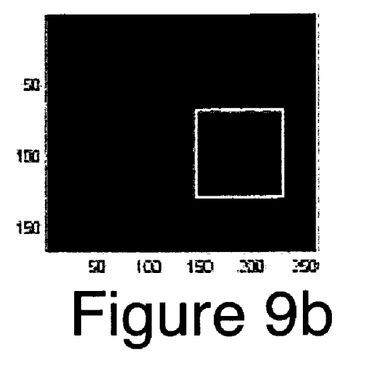
FIGS. 9b-9e show the projection image of the second, third, fourth and fifth PCA vectors, respectively, compared to the previously processed image.
Figure 9C:
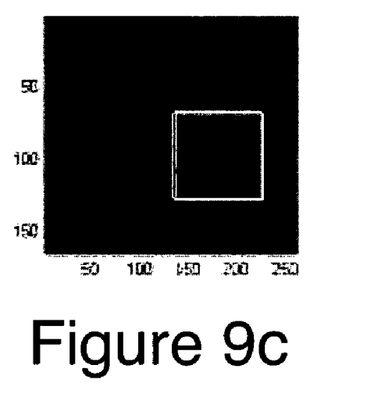
Figure 9D:
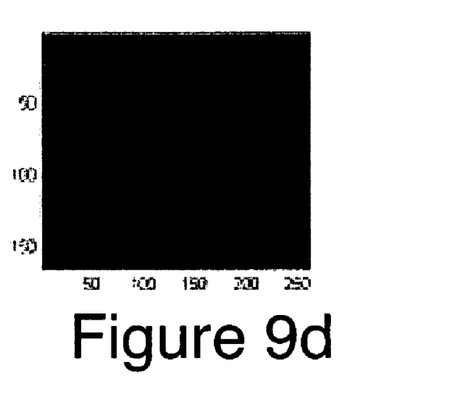
Figure 9E:
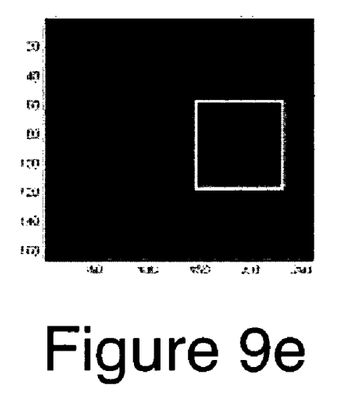

Returning to the discussion of the images found in FIGS. 8*a* and 8*b*, in the same sequence, we sampled two more positions (not shown) of the object for test and adaptation and a third position of the object shown in FIG. 9*a*. Note that the background and lighting conditions were basically similar to the first test images of FIGS. 8*a* and 8*b*. The adaptive features of the previous image were used to test the FIG. 9*a* and the results are shown in FIG. 9*b* (second principal component), FIG. 9*c* (third principal component), FIG. 9*d* (forth principal component), and FIG. 9*e* (fifth principal component). It appeared that the second, third and fifth component projection images are combined to give accurate object identification and location. The software preferably detects several maximum correlation areas and then looks for the most favorable place of the ROI among them.

In the examples noted above the first principal component is not being analyzed. The first principal component can be very important (and therefore perhaps should be included in the analysis) if the input vectors are normalized first. Normalization of that data requires additional data processing (and hence additional processing time) and, in order to speed up the data processing we chose to omit data normalization when doing the tests noted above. Also we anticipate that if data normalization is done, that the processing may involve more than the five principal vectors which we analyzed. When the input vectors are not normalized, for whatever reason, the first principal vector can often be ignored because it frequently looks like a signal with a relatively large DC offset which swamps useful signals having a very small amplitude. As such, without normalization, the first principal vector often does not have particularly useful information for this analysis.

Figure 10A:
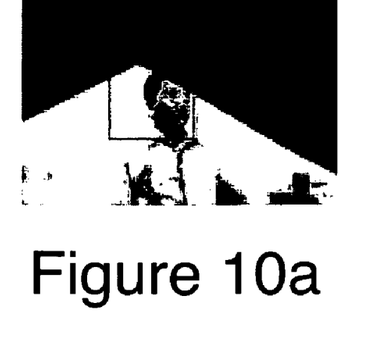
Figure 10B:
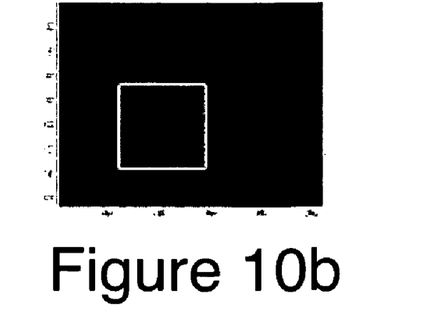
FIGS. 10b-10f show the projection image of the second, third, fourth and fifth PCA vectors, respectively, compared to the previously processed image.
Figure 10C:
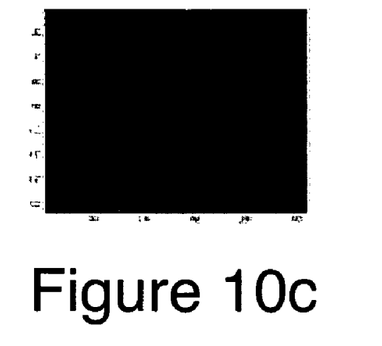
Figure 10D:
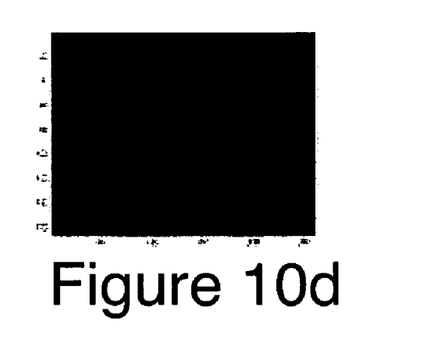
Figure 10E:
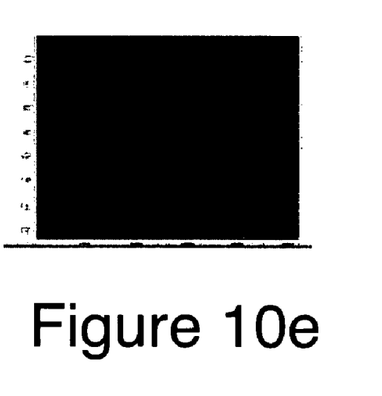
Figure 10F:
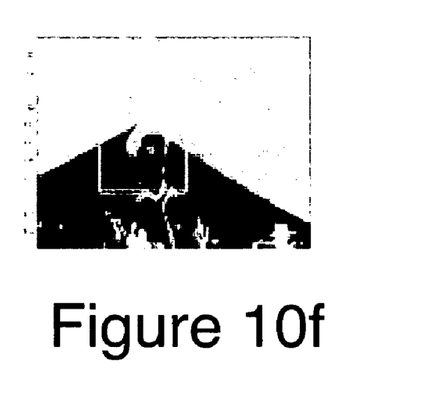

However, when the same object moved to a different lighting condition in FIG. 10*a*, the previous feature vectors provided ambiguous information and failed to locate the object shown in FIGS. 10*b*, 10*c*, 10*d* and 10*e*.

However, the suggested combination of color segmentation image and the second principal vector projection image should provide better object identification and location.

Having described the invention in connection with a preferred embodiment, modification will now suggest itself to those skilled in the art. As such the invention is not to be limited to the disclosed embodiments except as specifically required by the amended claims. For example, the invention has been described in the context of recognizing or identifying a human's face, Of course, this technique should be useful in recognizing other objects, both animate and inanimate. For example, animate objects could well include other portions of a human being having recognizable shape and color features. Thus this system should be easily adaptable to work with human eyes, finger and/or palm prints, or any combination face, finger, palm and retina shape and color features.

What is claimed is:

1. The A computer programmed for object identification comprising:
   a database for storing digital images of human faces together with extracted shape and color features associate therewith;
   a processor programming for extracting object shape features and object color features from digital images of a plurality of different digitally-captured objects and storing a plurality of extracted object shape features and object color features in said database for each different object, where a plurality of said extracted object shape features and object color features are associated with a unique identifier associated with said object in said database;
   the processor being further programmed to extract object shape features and object color features from a digital image of an object whose identity is being sought;
   the processor being further programmed to correlate the extracted object shape features and object color features of the object whose identity is being sought with at least a portion of the extracted object shape features and object color features previously stored in said database and
   (i) if a first correlation of the extracted object shape features is above a first threshold value for a given object associated with an identifier in said database and
   (ii) if a second correlation of the extracted object color features is above a second threshold value for said given object;
   the processor under program control making a determination that the object whose identity is being sought is said given object, wherein if said determination is made that the object whose identity is being sought is said given object, then modifying the database by adding the extracted object shape features and object color features of the object whose identity was being sought to said database and associating them with the identifier associated with said given object.

2. The computer programmed for object identification according to claim 1 wherein the object whose identity is being sought is or relates to a particular portion or portions of a human being.

3. The computer programmed for object identification according to claim 2 wherein the object whose identity is being sought is relates to a human's face.

4. A computer programmed for object identification comprising:
   a database for storing digital images of human faces together with extracted shape and color features associate therewith;
   a processor programming for extracting object shape features and object color features from digital images of a plurality of different digitally-captured objects and storing a plurality of extracted object shape features and object color features in said database for each different object, where a plurality of said extracted object shape features and object color features are associated with a unique identifier associated with said object in said database;
   the processor being further programmed to extract object shape features and object color features from a digital image of an object whose identity is being sought;
   the processor being further programmed to correlate the extracted object shape features and object color features of the object whose identity is being sought with at least a portion of the extracted object shape features and object color features previously stored in said database and
   (i) if a first correlation of the extracted object shape features is above a first threshold value for a given object associated with an identifier in said database and
   (ii) if a second correlation of the extracted object color features is above a second threshold value for said given object;
   the processor under program control making a determination that the object whose identity is being sought is said given object, wherein if said determination is made that the object whose identity is being sought is said given object, then modifying the database adding newly extracted object shape features and object color features of the object whose identity was being sought to said database and associating them with the identifier associated with said given object only if the correlations associated with the newly extracted object shape features and/or object color features of the object whose identity was being sought are less than a predetermined threshold indicating that the newly extracted object shape features and/or object color features differ sufficiently from previously stored values thereof to make adding the newly extracted shape features and/or object color features to said database worthwhile.

5. The computer programmed for object identification according to claim 4 wherein the object whose identity is being sought is or relates to a particular portion or portions of a human being.

6. The computer programmed for object identification according to claim 5 wherein the object whose identity is being sought is relates to a human's face.

7. A computer programmed for object identification comprising:
   a database for storing digital images of human faces together with extracted shape and color features associate therewith;
   a processor programming for extracting object shape features and object color features from digital images of a plurality of different digitally-captured objects and storing a plurality of extracted object shape features and object color features in said database for each different object, where a plurality of said extracted object shape features and object color features are associated with a unique identifier associated with said object in said database;
   the processor being further programmed to extract object shape features and object color features from a digital image of an object whose identity is being sought;
   the processor being further programmed to correlate the extracted object shape features and object color features of the object whose identity is being sought with at least a portion of the extracted object shape features and object color features previously stored in said database and (i) if a first correlation of the extracted object shape features is above a first threshold value for a given object associated with an identifier in said database and (ii) if a second correlation of the extracted object color features is above a second threshold value for said given object;

the processor under program control making a determination that the object whose identity is being sought is said given object, wherein (i) if the first correlation is above said first threshold value for a given object associated with an identifier in said database but (ii) the second correlation of the extracted object color features is below said second threshold value for said given object;

then making a determination that the object whose identity is being sought is said given object.

8. The computer programmed for object identification according to claim 7 wherein the object whose identity is being sought is or relates to a particular portion or portions of a human being.

9. The computer programmed for object identification according to claim 8 wherein the object whose identity is being sought is relates to a human's face.

10. A computer programmed for object identification comprising:

a database for storing digital images of human faces together with extracted shape and color features associate therewith;

a processor programming for extracting object shape features and object color features from digital images of a plurality of different digitally-captured objects and storing a plurality of extracted object shape features and object color features in said database for each different object, where a plurality of said extracted object shape features and object color features are associated with a unique identifier associated with said object in said database;

the processor being further programmed to extract object shape features and object color features from a digital image of an object whose identity is being sought;

the processor being further programmed to correlate the extracted object shape features and object color features of the object whose identity is being sought with at least a portion of the extracted object shape features and object color features previously stored in said database and (i) if a first correlation of the extracted object shape features is above a first threshold value for a given object associated with an identifier in said database and (ii) if a second correlation of the extracted object color features is above a second threshold value for said given object;

the processor under program control making a determination that the object whose identity is being sought is said given object, wherein (i) if the first correlation is below a first threshold value for a given object associated with an identifier in said database but (ii) the second correlation of the extracted object color features is above a second threshold value for said given object;

then correlating the extracted object shape features and object color features of the object whose identity is being sought with a large away of extracted object shape features and object color features previously stored in said database and if a large array correlation based thereon is better than a third threshold value for a given object associated with an identifier in said database, then making a determination that the object whose identity is being sought is said given object.

11. The computer programmed for object identification according to claim 10 wherein the object whose identity is being sought is or relates to a particular portion or portions of a human being.

12. The computer programmed for object identification according to claim 11 wherein the object whose identity is being sought is relates to a human's face.

13. A computer programmed for object identification comprising:

a database for storing digital images of human faces together with extracted shape and color features associate therewith;

a processor programming for extracting object shape features and object color features from digital images of a plurality of different digitally-captured objects and storing a plurality of extracted object shape features and object color features in said database for each different object, where a plurality of said extracted object shape features and object color features are associated with a unique identifier associated with said object in said database;

the processor being further programmed to extract object shape features and object color features from a digital image of an object whose identity is being sought;

the processor being further programmed to correlate the extracted object shape features and object color features of the object whose identity is being sought with at least a portion of the extracted object shape features and object color features previously stored in said database and (i) if a first correlation of the extracted object shape features is above a first threshold value for a given object associated with an identifier in said database and (ii) if a second correlation of the extracted object color features is above a second threshold value for said given object;

the processor under program control making a determination that the object whose identity is being sought is said given object, wherein the step of correlating the extracted object shape features and object color features of the object whose identity is being sought with the extracted object shape features and object color features previously stored in said database is performed only with respect to recently stored object shape features and object color features as opposed to the entire database.

14. The computer programmed for object identification according to claim 13 wherein the object whose identity is being sought is or relates to a particular portion or portions of a human being.

15. The computer programmed for object identification according to claim 14 wherein the object whose identity is being sought is relates to a human's face.

* * * * *